United States Patent [19]

Dhein et al.

[11] 4,324,880

[45] Apr. 13, 1982

[54] β-HYDROXYBUTYRIC ACID POLYESTERS, A PROCESS FOR THEIR PRODUCTION AND THEIR USE AS STARTING MATERIALS FOR LACQUERS

[75] Inventors: Rolf Dhein; Knud Reuter; Hans Rudolph, all of Krefeld; Jörg Pfitzner, Wuppertal, all of Fed. Rep. of Germany

[73] Assignee: Bayer Aktiengesellschaft, Leverkusen, Fed. Rep. of Germany

[21] Appl. No.: 209,392

[22] Filed: Nov. 24, 1980

[30] Foreign Application Priority Data

Nov. 29, 1979 [DE]  Fed. Rep. of Germany ....... 2948023

[51] Int. Cl.$^3$ .................... C08G 63/06; C08G 63/60
[52] U.S. Cl. .................................... 528/80; 528/302; 528/359; 528/361; 525/450

[58] Field of Search ................ 528/80, 302, 361, 359; 260/18 R, 22 A; 525/450

[56] References Cited

U.S. PATENT DOCUMENTS

| | | | |
|---|---|---|---|
| 3,522,219 | 7/1970 | Ciaperoni et al. | 528/359 X |
| 3,704,255 | 11/1972 | Braun | 528/361 X |
| 3,806,495 | 4/1974 | Schoen | 528/359 X |
| 4,101,533 | 7/1978 | Lafferty et al. | 528/361 X |
| 4,138,291 | 2/1979 | Lafferty | 435/29 X |

*Primary Examiner*—Earl A. Nielsen
*Attorney, Agent, or Firm*—Connolly and Hutz

[57] ABSTRACT

Polyesters having a hydroxyl number of from 50 to 400 and containing 20 to 90% by weight of co-condensed β-hydroxybutyric acid units have proved to yield transparent, glossy, elastic and hard coatings.

7 Claims, No Drawings

β-HYDROXYBUTYRIC ACID POLYESTERS, A PROCESS FOR THEIR PRODUCTION AND THEIR USE AS STARTING MATERIALS FOR LACQUERS

This invention relates to saturated and unsaturated polyesters, optionally modified with unsaturated fatty acids (alkyd resins), which contain at least 20% by weight of β-hydroxybutyric acid residues in co-condensed form, to a process for the production of these polyesters by transesterifying poly-β-hydroxybutyric acid (PHB) and to the use of the polyesters as starting materials for lacquers.

The use of hydroxycarboxylic acids or their derivatives (lactones) for the production of polyesters is known.

Thus, polyesters of lactones containing at least 6 C-atoms per molecule have been recommended for use as plasticisers in vinyl resins and for use as intermediate products for the production of elastomers and foams (U.S. Pat. Nos. 3,169,945 and 3,274,143).

According to U.S. Pat. No. 3,704,255, polyesters containing residues of polyhydroxycarboxylic acids (for example polypropiolactone and polycaprolactone) in co-condensed form are said to be suitable for use in particular as dispersion aids and also, in combination with polyisocyanates, polyglycidyl compounds, phenolic, urea or melamine resins, as coating compositions. On account of their limited crosslinkability, coatings of this type are not entirely satisfactory in regard to hardness and resistance in solvents.

Polyesters containing co-condensed ε-hydroxycaproic acid units are known from DE-OS No. 2,251,470. In conjunction with crosslinking resins, they are said to give flexible and hard stoving lacquers. The quantity of caprolactone preferably used for the production of these polyesters is said to be between about 9 and 17% because apparently smaller quantities do not guarantee the required elasticity whereas larger quantities give coatings that are too soft.

However, U.S. Pat. No. 3,140,267 describes alkyd resins into which ω-lactones, for example propiolactone, have been introduced by condensation in quantities of from 1 to 7% by weight.

Naturally occurring PHB has also be proposed as a polyester consisting solely of β-hydroxycarboxylic acid units (U.S. Pat. No. 4,138,291). Its use as a starting material for lacquers is prevented by its limited solubility in standard lacquer solvents; cf. Angew. Chem. 74, 342 (1962). In addition PBH is very brittle and hence requires relatively large amounts of plasticiser (U.S. Pat. No. 3,182,036). Finally, PHB gives opaque coatings without any gloss, a disadvantage which cannot be eliminated even by building up molecular weight under esterification conditions in accordance with U.S. Pat. No. 4,138,291.

In view of this prior art, it was extremely surprising to find that PHB can be chemically modified to form products which may be processed into transparent, glossy, elastic and hard coatings and which are therefore suitable for use as new starting materials for lacquers.

Accordingly, the present invention provides saturated and unsaturated, oil-free and oil-modified polyesters having a hydroxyl number of from 50 to 400 and preferably from 100 to 350 and containing co-condensed β-hydroxycarboxylic acid units, characterised in that the polyesters contain from 20 to 90% by weight and preferably from 40 to 70% by weight of co-condensed units corresponding to the following formula:

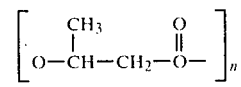

in which n has an average value of from 1 to 15 and preferably from 3 to 9, and from 80 to 10% by weight and preferably from 60 to 30% by weight of co-condensed residues of polyols and/or monohydric alcohols, mono- or poly- carboxylic acids and diisocyanates.

The β-hydroxybutyric acid units required for the synthesis of the polyesters according to the invention may be used in the form of β-butyrolactone or PHB.

PHB may be microbially produced. The number of microorganisms capable of being used for the synthesis of PHB is very large; for a synopsis see Angew. Chem. 74, 342 (1962). Suitable substrates for these microorganisms are, for example, effluents containing mono- and di-carboxylic acid from the synthesis of caprolactam, carbohydrates, for example, molasses, methanol, ethanol, glycerol or carbon dioxide (U.S. Pat. No. 4,138,291, Chem. Rundschau 30 (41), 14 (1977)).

PHB is made easier to obtain by the fact that up to 80% by weight, based on dry substance, of PHB may be contained in the microbial cell mass and extraction with cyclic carbonates, such as ethylene or propylene carbonate (cf. U.S. Pat. No. 4,138,291) or chloroform, does not involve any difficulties.

The average molecular weight $\overline{M}$ of the polyesters according to the invention depends upon their type. For unsaturated polyesters capable of radical copolymerisation with ethylenically unsaturated monomers, it amounts to between 700 and 5000 and preferably to between 1000 and 3000, for alkyd resins to between 1500 and 10,000 and preferably to between 2000 and 5000 and for oil-free saturated polyesters to between 400 and 8000 and preferably to between 500 and 4000 (molecular weights up to 5000 determined by vapour pressure osmometry in dioxane and acetone—in the event of differing values, the lower value is regarded as correct; molecular weights above 5000 determined by membrane osmometry in acetone).

Alkyd resins and polyesters are understood to be polycondensates obtained in known manner by polycondensation from alcohols and carboxylic acids, of the type defined for example in Rompp's Chemielexikon, Vol. 1, page 202, Franckh'sche Verlagsbuchhandlung, Stuttgart 1966 or in D. H. Solomon, The Chemistry of Organic Film-formers, pages 75 to 101, John Wiley and Sons Inc., New York, 1967.

In addition to the β-hydroxybutyric acid units, the polyesters according to the invention preferably contain only co-condensed residues of polyols, i.e. of aliphatic, cycloaliphatic and/or araliphatic alcohols containing from 2 to 6 OH-groups bound to non-aromatic C-atoms and from 2 to 24 C-atoms per molecule, such as glycols, for example ethylene glycol, 1,2-propane diol, 1,3-propane diol, 1,2-butane diol, 1,3-butane diol, 1,4-butane diol, 2,3-butane diol, 1,5-pentane diol, neopentyl glycol, 1,6-hexane diol, 2,5-hexane diol, 2-methyl-2,4-pentane diol, pinacol, 2 methyl 2 propyl-1,3-propane diol, 2,2-diethyl-1,3-propane diol, octane diol, 2-ethyl-1,3-hexane diol, 2,5-dimethyl-2,5-hexane diol, 2,2,4-trimethyl pentadiol, trimethyl-1,6-hexane diol, 1,2-octane diol, 1,2-cyclohexane diol, 1,3-cyclohexane diol, 1,4-cyclohexane diol, 2,2,4,4-tetramethyl-1,3-cyclobutane diol, 1,4-bis-(hydroxymethyl)-cyclohexane, 4,4'-(2-methylpentane-2,4-diyl)-bis-cyclohexanol, 1,3-phenylene-bis-(1,1-dimethyl-methanol), 1,4-phenylene-bis-(1,1-dimethylmethanol) and perhydrogenated 2,2-bis-(4-hydroxyphenyl)-propane.

The polyols may also contain —O—, —S— or —SO$_2$— as chain or ring members either once or several times. Preferred examples of hetero compounds such as these are diethylene glycol, triethylene glycol, tetraethylene glycol, dipropylene glycol, tripropylene glycol, thiodiglycol, 2,2-bis-(4-(2-hydroxyethoxy)-phenyl)-propane, perhydrogenated 2,2-bis-(4-(2-hydroxyethoxy)-phenyl)-propane, 4,4'-bis-(2-hydroxyethoxy)-diphenyl sulphide, 4,4'-bis-(2-hydroxyethoxy)-diphenyl sulphone, 1,1-bis-(4-(2-hydroxyethoxy)-phenyl)ethane, 1,1-bis-(4-(2-hydroxyethoxy)-phenyl)-cyclohexane, bis-(4-(2-hydroxyethoxy)-phenyl)-methane and 1,5-bis-(2-hydroxyethoxy)-naphthalene.

Preferred polyols also include alcohols containing from 3 to 6 OH-groups, including the corresponding hetero compounds, for example glycerol, trimethylol ethane, trimethylol propane, 1,2,6-hexane triol, erythritol, pentaerythritol, xylitol, sorbitol, mannitol, 1,3,5-cyclohexane triol, ethoxylated trimethylol ethane, ethoxylated trimethylol propane, ethoxylated hexitols, for example ethoxylated xylitol, sorbitol or mannitol and, generally, ethoxylated polyalcohols containing from 3 to 6 hydroxy groups and ethoxylated trisphenols.

Particularly suitable polyols are ethylene glycol, 1,2-propane diol, neopentyl glycol, 1,6- hexane diol, diethylene glycol, glycerol, trimethylol ethane, trimethylol propane, pentaerythritol.

The preferred polyesters according to the invention may be synthesised for example from PHB and polyols under transesterification conditions.

The transesterification reaction is preferably carried out in the presence of a non-proton-acid transesterification catalyst from the group comprising phosphorous acid esters, orthotitanic acid esters and related compounds of titanium or tin compounds. Organotin compounds from the group comprising dialkyl tin oxides, for example, dibutyl tin oxide, and the group comprising dialkyl tin dicarboxylates for example, dibutyl tin dioctoate, dibutyl tin dilaurate, are particularly suitable. The transesterification catalyst may be used in quantities of from 0.001 to 2% by weight and preferably in quantities of from 0.05 to 1% by weight, based on the reaction mixture.

Since PHB has a tendency towards degradation reactions under heat, particularly to form crotonic acid (Nature 191, 463 (1961), U.S. Pat. No. 2,361,036), it is important to pay particular attention to the temperature conditions in the production of the polyesters according to the invention because in some cases a temperature deviation of only 5° can jeopardise the success of the reaction. Suitable reaction temperature for the transesterification of PHB with polyols are generally in the vicinity of the melting point of PHB, i.e. in the temperature range from 150° to 190° C. and preferably in the range from 160° C. to 170 ° C.

In addition to polyols, the polyesters according to the invention may also contain aliphatic, cycloaliphatic and aromatic polybasic carboxylic acids, preferably di-, tri- and tetra-carboxylic acids contains from 4 to 12 carbon atoms per molecule or their esterifiable derivatives (for example anhydrides or esters of lower alcohols containing from 1 to 4 C-atoms), for example, phthalic acid, isophthalic acid, terephthalic acid, tetrahydrophthalic acid, hexahydrophthalic acid, hexahydroisophthalic acid, hexahydroterephthalic acid, methyltetrahydrophthalic acid, endomethylene tetrahydrophthalic acid, glutaric acid, succinic acid, adipic acid, trimellitic acid, pyromellitic acid and their esterifiable derivatives. Phthalic acid anhydride and adipic acid are particularly suitable. Where PHB is transesterified with polyols and polybasic carboxylic acids, the polyol/polycarboxylic acid ratio is determined by the required hydroxyl number of the polyesters according to the invention. In addition, the polyesters according to the invention may be modified with monohydric aliphatic, cycloaliphatic or araliphatic alcohols containing from 1 to 18 C-atoms, for example benzyl alcohol, hexahydrobenzyl alcohol, 2-ethyl hexanol, or with aliphatic, cycloaliphatic or aromatic monocarboxylic acids containing from 2 to 24 C-atoms, for example benzoic acid, p-tert.-butyl benzoic acid and hexahydrobenzoic acid.

To obtain alkyd resins, unsaturated fatty acids (or the corresponding esters) may be incorporated by condensation. Preferred fatty acids are soya oil fatty acid, linseed oil fatty acid, ricinene fatty acid, cottonseed oil fatty acid, safflower oil fatty acid and peanut oil fatty acid; the fatty acids and fatty acid mixtures obtained therefrom with isomerisation catalysts may also be used. To incorporate these fatty acids by condensation, it is possible to use the free fatty acids or the hydroxyfunctional fatty acid esters obtained in known manner by transesterifying the natural oils with glycerol or with other polyalcohols, such as trimethylol ethane and trimethylol propane. The fatty acid esters may also be incorporated in the polyesters through diisocyanates, for example tolylene diisocyanate or isophorone diisocyanate, as known to the skilled man.

Polyesters according to the invention may be obtained particularly easily from PHB, polyols and polycarboxylic acids (or their derivatives) by a process in which PHB is transesterified with the polyol component in a first reaction step and the polyester-polyol formed is esterified with the dicarboxylic acid (or a derivative thereof) in a second step.

Instead of using the dicarboxylic acids or their derivatives, polyisocyanates, preferably diisocyanates containing from 4 to 12 carbon atoms, for example tolylene diisocyanate, hexamethylene diisocyanate, isophorone diisocyanate, may also be used in known manner for the further synthesis of the polyester from the polyester polyols produced in the first reaction step.

Through the incomplete incorporation by esterification of tribasic or polybasic carboxylic acids or through subsequent semiester formation with dicarboxylic acid anhydrides, such as phthalic acid anhydride or tetrahydrophthalic acid anhydride, it is readily possible for the expert to obtain water-dilutable resins by neutralising the free COOH-groups with ammonia or amines in the presence of organic auxiliary solvents.

The polyesters of PHB according to the invention may be crosslinked with aminoplast resins, such as urea resins, guanamine resins or melamine resins. It is preferred to use melamine resins of which the methylol groups are completely or partly etherified with monohydric alcohols containing from 1 to 4 carbon atoms, such as methanol, butanol, isobutanol. Suitable hardening conditions are, for example, 30 minutes at 120° C. Where melamine resins of the hexamethoxy methyl melamine type are used, an acid catalyst, for example p-toluene sulphonic acid may be added.

The polyesters of PHB according to the invention may also be hardened with polyisocyanates or polyisocyanate donors. Standard polyisocyanates are, for example, the addition products of tolylene diisocyante with polyhydric alcohols, such as trimethylol propane, diisocyanates of tolylene diisocyanate, hexamethylene diisocyanate, isophorone diisocyanate prepolymerised through isocyanurate groups or mixtures thereof, products precondensed through biuret groups, for example of hexamethylene diisocyanate. The hardening conditions are no different from those used for conventional systems. Hardening may be carried out both at room temperature and, in the form of forced drying, at an elevated temperature, for example 80° C., which is used in particular for systems containing aliphatic polyisocyanates. The saturated, aliphatic, cycloaliphatic or aromatic dicarboxylic acids moiety of the polyesters according to the invention may also be completely or partly replaced by olefinically unsaturated dicarboxylic acids. Dicarboxylic acids such as these or derivatives suitable for incorporation by condensation are, for example, fumaric acid, maleic acid anhydride, itaconic acid, citraconic acid, mesaconic acid, dichloromaleic acid (anhydride), particularly furmaric acid and maleic acid anhydride.

Unsaturated polyesters are thus obtained which are dissolved in copolymerisable monomers and which may be hardened as laminates in the layer thicknesses normally selected for unsaturated polyester resins, for example 60 to 500 μm. The hardening may be effected either at room temperature or at elevated temperature, for example 40° to 80° C., in the presence of the usual peroxidic initiators, particularly ketone peroxides or cumene hydroperoxide, and metal accelerators, particularly cobalt-II-carboxylates, and optionally paraffins or waxes. Preferred copolymerisable monomers are, for example, styrene, vinyl toluene, divinyl benzene, methacrylic acid esters, vinyl acetate, diallyl phthalate and diallyl fumarate.

In addition, alcohols containing allyl or benzyl ether functions (cf. DE-AS No. 10 24 654), for example glycerol monoallyl ether, glycerol diallyl ether, trimethylol propane monoallyl ether, trimethylol propane diallyl ether, pentaerythritol triallyl ether and trimethylol propane dibenzyl ether, may be incorporated in the polyesters according to the invention by condensation.

It is known that the inhibition of surface hardening by oxygen may be prevented in this way.

The alkyd resins of PHB according to the invention may be produced with the usual oil contents for alkyd resins, i.e. short-, medium- and long-oiled, and dry in thin films in the air to form tack-free coatings in the presence of the usual metal siccatives from the group comprising Co—, Pb—, Mn—, Ca—, Fe—salts, such as octoates and naphthenates. The resins according to the invention may also be oven-dried in the usual way for short- and medium-oil resins and may be combined with aminoplast resins, particularly melamine resins, in the usual ratios by weight of alkyd to melamine resins of from 10:1 to 1:1 and preferably from 8:2 to 6:4 (parts by weight of solid resin) to form oven-drying coatings.

Particularly preferred PHB-alkyd resins are those produced in two stages, in the first of which PHB is transesterified with dialcohols, polyalcohols and/or optionally on average di- or poly-hydroxyfunctional polyalcohol fatty acid esters of unsaturated drying fatty acids, after which the polyester units are extended with dicarboxylic acid (anhydrides) and/or diisocyanates to form the final resin and, optionally, further monocarboxylic acids are incorporated by condensation. The unsaturated fatty acids or their hydroxyfunctional esters and, optionally, further monocarboxylic acids may also be incoporated in the second stage.

The polyesters according to the invention may be used as starting materials for lacquers.

The percentages by weight quoted on pages 2 and 3 are based in each case on the polyesters according to the invention.

EXAMPLES

The parts and percentages quoted in the following Examples represent parts by weight and percentages by weight, respectively.

EXAMPLE 1

103 parts of PHB, 32 parts of trimethylol propane and 1.35 parts of dibutyl tin oxide are melted and stirred at 160° C. until a sample is miscible in any ratio with ethyl glycol acetate (EGA), A viscous resin having the following characteristics is obtained: acid number 13, hydroxyl number 305 (theoretical 298), viscosity 93 mPa.s (70% in EGA). The polyester-polyol is dissolved in EGA to form a 50% solution. Clear lacquers are prepared using polyisocyanate and applied to glass plates. Further particulars and film properties are shown in Table 1.

In admixture with a butylated melamine-formaldehyde resin, for example in a ratio by weight of 6:4, based on solid resin, the same polyester-polyol gives tack-free, glossy stoving coatings (130° C., clear lacquers with a dry film layer thickness on glass of 50 μm).

With hexamethoxy methyl melamine, for example in a ratio by weight of 65:35, based on solid resin, and 1.0% of p-toluene sulphonic acid, based on the total weight of the binder, the same polyesterpolyol gives tack-free and scratch-resistant coatings (clear lacquer with a dry film layer thickness on glass of 70 μm) after 15 minutes at 120° C.

EXAMPLE 2

103 parts of PHB, 32 parts of pentaerythritol and 1.35 parts of dibutyl tin oxide are reacted as described in Example 1 until miscibility in any ratio with EGA is obtained. A viscous resin having the following characteristics is obtained: acid number 14, hydroxyl number 397(theoretical 398), viscosity 103 mPa.s (70% in EGA). The polyesterpolyol is dissolved in EGA to form a 50% solution, clear lacquers are prepared with polyisocyanate and applied to glass plates. Further particulars and film properties are shown in the Table.

EXAMPLE 3

86 parts of PHB, 46 parts of trimethylol propane and 1.1 parts of dibutyl tin oxide are melted and stirred for 24 hours at 160° C. 22 parts of phthalic acid anhydride are then added and the resulting reaction mixture is heated to 185° C. until 3.2 parts of water have been separated off (99% of the theoretical quantity).

Small quantities of more readily volatile consistuents are removed in a water jet vacuum at 150° C. A yellowish to pale-brown, viscous resin having an acid number of 10 and a viscosity of 1600 mPas (70% in EGA) is obtained. In admixture with a butylated melamine-formaldehyde resin, for example in a ratio by weight of 7:3, based on solid resin, tack-free glossy stoving lacquers (130° C.,clear lacquers having a dry film thickness on glass of 50 μm) are obtained.

EXPLANATION OF TABLE

Polyisocyanate A was a 67% solution (NCO-content 11.5%) in EGA/xylene (ratio by weight 1:1) of an addition product of tolylene diisocyanate and trimethylol propane;

polyisocyanate B was a 51% solution (NCO-content 8%) in butyl acetate of a polyisocyanurate-prepolymer of tolylene diisocyanate; polyisocyanate C was a 75% solution (NCO-content 16.5%) in EGA/xylene (ratio by weight 1:1) of a biuret-group-containing polyisocyanate of hexamethylene diisocyanate and water.

TABLE

Film properties of two-component lacquer systems corresponding to Examples 1 and 2

| Polyester of Example No. | Polyisocyanate | NCO/OH ratio | Dry film layer thickness [nm] | Drying conditions* [°C.;h] |
|---|---|---|---|---|
| 1 | A | 1 | 70 | 23;8/23;72 |
| 1 | A | 1.25 | 70 | 23;8/23;72 |
| 2 | A | 1 | 70 | 23;8/23;72 |
| 2 | A | 1.25 | 70 | 23;8/23;72 |
| 1 | B | 1 | 60 | 23;2/23;24 |
| 1 | B | 0.7 | 60 | 23;2/23;24 |
| 2 | B | 1 | 60 | 23;2/23;24 |
| 1 | C | 1 | 70 | 80;½ + 23;4 |
| 2 | C | 1 | 70 | 80;½ + 23;4 |

| Polyester of Example No. | Konig pendulum hardness [sec] |
|---|---|
| 1 | 42/160 |
| 1 | 46/166 |
| 2 | 63/174 |
| 2 | 62/184 |
| 1 | 115/156 |
| 1 | 82/128 |
| 2 | 137/162 |
| 1 | 129 |
| 2 | 105 |

*up to determination of pendulum hardness

What is claimed:

1. Polyesters having a hydroxyl number of from 50 to 400 and containing co-condensed β-hydroxycarboxylic acid units, characterised in that the polyesters contain from 20 to 90% by weight of co-condensed units corresponding to the following formula

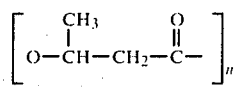

in which n has an average value of from 1 to 15, and from 80 to 10% by weight of co-condensed residues of polyols and optionally monohydric alcohols, mono- or polycarboxylic acids and diisocyanates.

2. Polyesters as claimed in claim 1, characterised in that they have a hydroxyl number of from 100 to 350.

3. Polyesters as claimed in claim 1 or 2, characterised in that they contain from 40 to 70% by weight of the co-condensed units corresponding to the following formula:

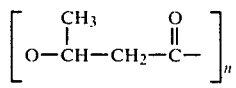

and from 60 to 30% by weight of co-condensed residues of polyols and/or monohydric alcohols, mono- or polycarboxylic acids and diisocyanates.

4. Polyesters as claimed in claims 1 or 2, characterised in that n has an average value of from 3 to 9.

5. A process for producing the polyesters as claimed in claims 1 or 2, characterised in that poly-β-hydroxybutyric acid and polyols and optionally monohydric alcohols, mono- or poly- carboxylic acids and diisocyanates are transesterified with one another at 150° to 190° C.

6. A process as claimed in claim 5, characterised in that, in the first stage of the reaction, poly-β-hydroxybutyric acid is transesterified with polyalcohol after which the reaction mixture obtained is esterified with mono- or poly-carboxylic acids, diisocyanates and/or monohydric alcohols.

7. A lacquer containing the polyester of claims 1 or 2.

* * * * *